United States Patent [19]
Wirkus

[11] Patent Number: 5,157,859
[45] Date of Patent: Oct. 27, 1992

[54] FISHING JIG

[76] Inventor: Clarence L. Wirkus, 13435 Jay St., Anoka, Minn. 55304

[21] Appl. No.: 640,834

[22] Filed: Jan. 14, 1991

[51] Int. Cl.$^5$ ............................................. A01K 85/00
[52] U.S. Cl. .................................. 43/42.37; 43/42.37; 43/42.52
[58] Field of Search ................. 43/42.37, 42.38, 42.39, 43/42.52

[56] References Cited
U.S. PATENT DOCUMENTS

| | | | |
|---|---|---|---|
| 3,757,451 | 9/1973 | Cottle | 43/42.37 X |
| 4,827,660 | 5/1989 | Dudeck | 43/42.39 |
| 4,945,669 | 8/1990 | Webel | 43/42.39 |

Primary Examiner—Richard K. Seidel
Assistant Examiner—Patty E. Hong
Attorney, Agent, or Firm—Henry C. Kovar

[57] ABSTRACT

A fishing jig has a hook and a body rigidly secured to the hook. The hook has an elongate longitudinal shank, an upturned curved tail end with a forward facing point, and an upright front shank section that extends up to a generally oval shape as seen in plan, and has a convex upper surface and a completely concave lower surface bounded by a flat plan perimeter. The body extends forward of the front shank section and to the eye. The hook longitudinal shank is embedded in the body above the concave lower surface and above the plan perimeter. The jig has a much improved "action" during both ascent and descent for enticing fish to bite. A new asthetic design is embodied in the jig.

20 Claims, 1 Drawing Sheet

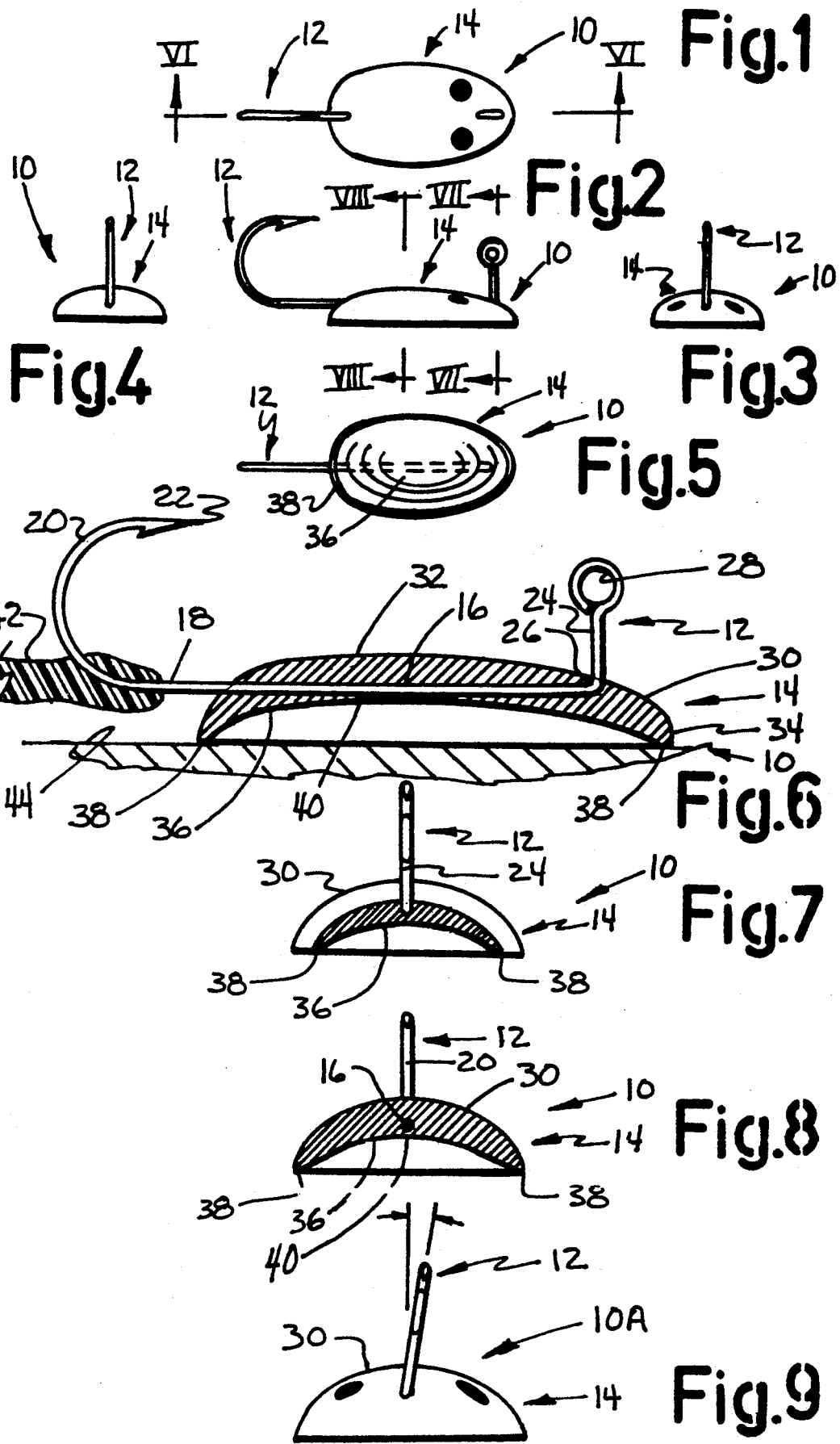

FISHING JIG

BACKGROUND OF THE INVENTION

1. Field of the Invention

This invention pertains to a new and improved fishing jig of the type having a non-bouyant body rigidly secured to a hook.

2. The Prior Art

Fishing jigs are old, well known and extensively used. The typical jig is a specific type of artificial fishing lure having a hook with body rigidly secured to it. The most frequently seen body is a lead ball or some other solid form cast in lead upon the hook.

Jigs are commonly used with an additional bait such as a minnow, worm, leech, pork rind, feather, plastic worm or wriggler and so forth secured to the jig hook.

Jigs per se by themselves do not provide or offer any enticing motion or action. The additional bait is usually relied upon to provide the "action" for jig fishing. "Action" is a very subjective term used by fisherman to denote the motion of a bait which presumably attracts fish to the bait.

Various jig head configurations have been devised to bounce on the bottom, hold the hook in a particular attitude, provide securement for the additional bait, enhance optical visibility, and so forth. However, all of these jigs tend to move straight up when pulled up, and to fall straight down when dropped.

OBJECT OF THE INVENTION

It is an object of this invention to provide a new and improved fishing jig having a body which provides an unusual motion or "action" to the jig.

It is an object of this invention to provide a fishing jig that has "action" during decent.

It is an object of this invention to provide a fishing jig that will provide "action" during ascent.

It is an object of this invention to provide a fishing jig that will hold its hook facing upward.

It is an object of this invention to provide a new design for a fishing jig.

SUMMARY OF THE INVENTION

A fishing jig has a hook with a longitudinal end, a hook point and an eye, and a body rigidly secured to the hook, the body has a convex upper side, a concave lower side, and a concavity perimeter spaced below the hook shank.

A fishing jig has a hook with an elongate longitudinal shank and a tail curved tail end and an eye above the shank, a non-buoyant body rigidly secured to the hook, the body has a concave lower side below the shank and a concavity perimeter below the shank, and a front portion of the shank is embedded in the body above the concavity and above the perimeter.

A new design for a fishing jig, as herein shown and described.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 1 is a top plan view of the preferred embodiment of the fishing jig of the present invention;

FIG. 2 is a side elevational view of the device of FIG. 1, the other side being the mirror image thereof;

FIG. 3 is a front end elevational view;

FIG. 4 is a back end elevational view;

FIG. 5 is a bottom plan view;

FIG. 6 is an elevational section through lines VI—VI of FIG. 1;

FIG. 7 is an elevational section through lines VII—VII of FIG. 2;

FIG. 8 is an elevational section through lines VIII—VIII of FIG. 2; and

FIG. 9 is a front elevation view of a preferred alternative embodiment of the structure of FIG. 1.

DESCRIPTION OF THE PREFERRED EMBODIMENT

In accordance with the principles of the present invention, a new and improved fishing jig is shown in FIGS. 1-9 and generally indicated by the numeral 10. The jig 10 has a hook 12 and a body 14.

The hook 12, which is best shown in FIG. 6, is a single length of wire and has a central elongate longitudinal shank 16 which is preferably straight and which extends along a fore-aft centerline of the jig 10. The longitudinal shank 16 is longer than the body 14 and has a tail end portion 18 that extends to a 180 degree curved portion 20 which turns back towards the front of the jig 10 and has a hooking point 22. The point 22 is aft of and is spaced above the body 14. At the front of the hook 12 and at the front of the longitudinal shank 16 is a generally upright front shank secion 24 which extends upward from a sharp bend 26 to an eye 28. The front shank section 24 is co-planar with the curved portion 16 of the hook 12 as best seen in FIGS. 1, 3, 4, 7, 8 and 9. The front shank section 24 preferably extends straight up or vertically to the eye 28 which is spaced above the body 14 but which is below the point 22, specifically the eye 28 is closer to the longitudinal shank 16 than the point 22. The eye 28 is directly above the body 14.

The body 14 is preferably non-buoyant and a preferred body material is cast lead. The body 14, as seen from the top in FIG. 1, is generally oval, being wider in the back than at the front, and being generally symetrical about the plane of the hook 12 and about the longitudinal shank 16. The top of the body 14 has a completely convex upper surface 30 that has an apex 32 centered above the longitudinal shank 16 between the point 22 and the eye 28. The apex 28 is closer to the eye 28 than to the point 22.

The convex curvature of the upper surface 30 on the aft of the body 14 is of smaller radius than the curvature of the upper surface 30 on the front of the body 14 as best seen in FIG. 6. A body nose 34 extends forward of the front shank section 24 and forward of the eye 28. As seen in FIGS. 2 and 6, the convex curvature of the upper surface 30 extends the entire longitudinal length of the body 14 and both above and below the level of the longitudinal shank 16. The convex curvature of the upper surface 30 also extends transversely the entire width of the body 14 as best shown in FIGS. 3, 4, 7, 8 and 9.

An important feature of this jig 10 is a completely concave lower surface 36 within a concavity perimeter 38 that is best seen in FIG. 5 as being the perimeter in plan of the body 14. Within the perimeter 38, the entire lower surface 36 is continuously concave, and the aft part of the lower surface 36 has a smaller radius curvature than the nose 34 as is shown in FIG. 6. The lower surface 36 also extends forward of the eye 28 and the front shank section 24. As shown in FIGS. 7 and 8, the lower surface 36 is continuously concave transversely to both sides of the hook 12, and as seen in FIG. 6, the entire length of the lower surface 36 is continuously concave. The transverse concaveness has a smaller radius than the longitudinal concaveness. The concavity perimeter 38 is an edge or rim surrounding the concave lower surface 36 and is the bottom of the lower surface 36 and the body 14.

The entire forward section of the longitudinal shank 16 immediately adjacent to the bend 26 is embedded within the body 14 and is above and spaced from both the concave lower surface 36 and the perimeter 38. The lower surface 36 has an upper apex 40 which is toward and closer to the rear of the body 14 and which is spaced below the longitudinal shank 16. Both exposed ends of the hook 12 extend out of the convex upper surface 30. The hook longitudinal shank 16 is parallel to the body perimeter 38.

As shown in FIG. 6, the jig 10 may be used with a trailing additional bait 42 which is typically flexible and may be a worm, leech, plastic wiggler, etc. As also shown in FIG. 6, the jig 10 tends to sit or rest stably on the perimeter 38 and to hold the hook point 22 extending up when the jig 10 lands upon a bottom 44. The jig 10 does not tip over when landing on a generally horizontial bottom surface 44.

The body 14 and hook 12 are normally generally perpendicular to each other as shown in FIGS. 1, 3, 4, 5, 7 and 8, the body 14 and hook 12 may be slightly canted as shown in FIG. 9 for reasons to be explained. Specifically, the perimeter 38 is in a plane perpendicular to a plane of the hook 12.

The jig 10 is made and manufactured by the conventional technique of casting lead over the hook 12 to form the body 14.

In the use of the jig 10, the jig 10 has been found to have a compound and complicated movement that gives what is very subjectively referred to in fishing jargon as "action" to entice fish to attack and bite the jig 10. The jig 10 will go from side to side when pulled up and deviate from a normal straight up line during ascent. When dropped, the jig 10 decends in a series of steps, like a falling leaf, as the convex lower surface 36 catches the water. The slightly canted embodiment of the jig 10A in FIG. 9 goes around in a generally helical decent pattern, with deviations up and down from a true helical path.

The jig 10 has no unnecessary appendages to hang up and snag underwater objects. The jig 10 will rotate upward and off of anything snagged by the nose 34.

The free-hanging angle of the jig 10, wherein when the jig 10 is suspended in the water by a line, is important in the operation of the jig 10. The jig 10 hangs with the nose 34 and the hook curved end 20 down, with the plane of the body perimeter 38 being at about 45 degrees from upright. Consequently, when the jig 10 is pulled upward, the jig 10 ascends at about a 45 degree angle rather than straight up as the prior art jigs do. The jig always ascents in a path that is generally co-axial with and in front of the hook longitudinal shank 16. The jig 10 does not tend to point in a given direction and consequently the direction of the ascention path is entirely unpredictable and may be in any direction which gives great variation to the "action" of the jig 10.

During decent the jig 10, when it is used without the additional bait 42, will slide backwards and downwards on the concave lower surface 36. The jig 10 will decend backwards at about a 45 degree angle rather than fall straight down as do the prior art jigs. As the jig 10 goes backwards, it turns about itself because of the hydrodynamic unstability of the concave surface 36 and the decent slide zig-zags and has a truly bizarre motion that closely proximates a crippled bait fish. The jig 10 also decents relatively slowly as compared to the prior art lead head jigs that go straight down.

When the jig 10 is used with an additional bait 42, the jig 10 has a motion that looks as though the additional bait 42 is chasing the jig 10.

The jig 10 is exceptional at presenting itself underwater.

This jig 10 has been tested by me and my family in northern Minnesota and has been found and proven to be exceptionally effective for successful fishing of bass, and for other species of fish.

Although other advantages may be found and realized and various modifications may be suggested by those versed in the art, be it understood that I embody within the scope of the patent warranted hereon, all such embodiments as reasonably and properly come within the scope of my contribution to the art.

I claim as my invention:

1. A fishing jig comprising
    a) a hook having an elongate longitudinal shank, a curved end extending upward to a forward facing point, and an eye for connection of the jig to a fishing line;
    b) a body rigidly secured to said hook, said body having an upper convex side facing said eye, a lower concave side defining a concavity facing downward away from said eye, and a concavity perimeter around said concavity, said perimeter being spaced below said shank.

2. The jig of claim 1, in which said lower side is completely concave.

3. The jig of claim 1, in which an entire longitudinal length of the body lower side is concave.

4. The jig of claim 1, in which an entire transverse width of the body lower side is concave.

5. The jig of claim 1, in which said body and concave lower side are longer than they are wide.

6. The jig of claim 1, in which said body and said lower concave side extend forward of said eye.

7. The jig of claim 1, in which said perimeter is planar.

8. The jig of claim 1, in which said perimeter is generally oval.

9. The jig of claim 8, in which an aft portion of the body and the lower concave surface are wider than a frontal portion.

10. The jig of claim 1, including a front shank section extending from said longitudinal shank upward to said eye, said front shank extending from said eye to said body.

11. The jig of claim 10, in which said eye is spaced above said body and said perimeter.

12. The jig of claim 10, in which front shank is generally vertical, and generally perpendicular to a plane of said perimeter.

13. The jig of claim 1, in which the entirety of said hook is spaced above a plane of said perimeter.

14. The jig of claim 1, in which said longitudinal shank is parallel to a plane of said perimeter.

15. A fishing jig comprising
   a) a hook having an elongate longitudinal shank, a curved tail and extending around from a tail end of the shank to a forward facing point, and a front shank section extending upward from a front end of the longitudinal shank to an eye for connection of the jig to a fishing line, said eye being spaced above the longitudinal shank;
   b) a non-bouyant body rigidly secured to said hook, said body having a concave lower side defining a concavity below said longitudinal shank, and a concavity perimeter about said concavity and below said longitudinal shank; and
   c) a front portion of said longitudinal shank being embedded in said body directly above said concavity and above said concavity perimeter.

16. The jig of claim 15, in which said lower side is completely concave.

17. The jig of claim 15 in which the eye is forward of a center of the concave lower side, and rearward of a front end of the concave lower side.

18. The jig of claim 15, in which said longitudinal shank and said perimeter are generally parallel to each other.

19. The jig of claim 15, in which said curved tail extends upward from said concave lower side, said hook point being spaced above said perimeter.

20. A sinking fishing jig comprising
   a) a hook having an elongate longitudinal shank, a curved aft end extending upward to a forward facing point which is above the shank, a sharp bend at a front end of the shank, an attachment eye spaced upward from the shank, and a generally upright front shank section extending upward from the sharp bend to the eye;
   b) a non-buoyant metal body rigidly secured to a front portion of said shank, said body extending forward of said upright shank section and forward of said eye;
   c) a concave lower side on said body and defining a concavity which is below and which extends forward of said hook shank and said hook eye; and
   d) a generally flat concavity perimeter on said body lower side, said perimeter bounding said concavity and defining a planar bottom of said body, said perimeter being below said shank and extending forward of said eye, with a majority of said concavity and said perimeter being aft of said eye.

* * * * *